(12) United States Patent
Connell

(10) Patent No.: US 12,304,115 B2
(45) Date of Patent: May 20, 2025

(54) TOOLING METHOD FOR MOLDING COMPOSITE DUCTS

(71) Applicant: Textron Innovations, Inc., Providence, RI (US)

(72) Inventor: Christopher Lee Connell, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 687 days.

(21) Appl. No.: 16/924,464

(22) Filed: Jul. 9, 2020

(65) Prior Publication Data

US 2021/0008765 A1 Jan. 14, 2021

Related U.S. Application Data

(60) Provisional application No. 62/872,787, filed on Jul. 11, 2019.

(51) Int. Cl.
| | |
|---|---|
| *B29C 33/52* | (2006.01) |
| *B29C 33/38* | (2006.01) |
| *B29C 33/44* | (2006.01) |
| *B29C 70/30* | (2006.01) |
| *B29K 105/08* | (2006.01) |
| *B33Y 10/00* | (2015.01) |
| *B33Y 80/00* | (2015.01) |

(52) U.S. Cl.
CPC .......... *B29C 33/52* (2013.01); *B29C 33/3842* (2013.01); *B29C 33/448* (2013.01); *B29C 70/302* (2021.05); *B33Y 80/00* (2014.12); *B29K 2105/0872* (2013.01); *B29K 2909/02* (2013.01); *B33Y 10/00* (2014.12)

(58) Field of Classification Search
CPC ... B29C 33/52; B29C 33/3842; B29C 33/448; B29C 70/302; B29C 70/32; B29C 33/38; B33Y 80/00; B33Y 10/00; B29K 2105/0872; B29K 2909/02
See application file for complete search history.

(56) References Cited

U.S. PATENT DOCUMENTS 5,897,431 A * 4/1999 Warner ............... A46D 3/04
451/540
6,458,306 B1 10/2002 Nelson et al.
(Continued)

FOREIGN PATENT DOCUMENTS

WO 2017148998 A1 9/2017

*Primary Examiner* — John J DeRusso
*Assistant Examiner* — Victoria Bartlett
(74) *Attorney, Agent, or Firm* — Avek IP, LLC

(57) ABSTRACT

A mandrel mold tool for forming a mandrel includes a plurality of mandrel mold tool members that are configured for fastening together to form a mandrel mold tool having an internal compartment. The plurality of mandrel mold tool members each include an outer wall, an inner wall adjacent the outer wall, and an interior portion between the outer wall and the inner wall. The interior portion has a sparsely-infilled structure that is substantially permeable to fluids. The outer wall has a port for receiving a hardening fluid. The inner wall has a plurality of through-holes such that the hardening fluid, upon being introduced via the port, passes through the interior portion and the plurality of through-holes for hardening a sacrificial mold disposed in the internal compartment.

20 Claims, 4 Drawing Sheets

(56) References Cited

U.S. PATENT DOCUMENTS

| | | | |
|---|---|---|---|
| 6,824,636 B2 | 11/2004 | Nelson et al. | |
| 9,815,268 B2 | 11/2017 | Mark et al. | |
| 2002/0171172 A1* | 11/2002 | Lowell | B29C 70/72 |
| | | | 264/279 |
| 2005/0169762 A1 | 8/2005 | Blume | |
| 2010/0075074 A1* | 3/2010 | Wilson | B29C 53/821 |
| | | | 425/441 |
| 2016/0121555 A1* | 5/2016 | Kunc | B29C 33/448 |
| | | | 264/219 |
| 2018/0009134 A1* | 1/2018 | Berben | B33Y 70/00 |
| 2018/0370082 A1* | 12/2018 | Mathon | B29C 70/32 |
| 2019/0061287 A1* | 2/2019 | Amon | B29C 53/82 |
| 2019/0381751 A1* | 12/2019 | Matlack | B29C 70/443 |

\* cited by examiner

DETAIL A

TOOLING METHOD FOR MOLDING COMPOSITE DUCTS

CROSS-REFERENCE TO RELATED APPLICATIONS

This application claims the benefit of U.S. Provisional Patent Application No. 62/872,787, entitled Tooling Method for Molding Composite Ducts, and filed Jul. 11, 2019, the entire contents of which are herein incorporated by reference.

BACKGROUND

1. Field

Embodiments of this disclosure relate generally to composite manufacturing methods and more specifically to a mandrel mold tool formed via additive manufacturing that is adapted to form a mandrel for molding composite ducts.

2. Description of the Related Art

Methods for forming hollow components made of composite material via a mandrel mold are known. For example, U.S. Pat. Nos. 6,458,306 and 6,824,636, both to Nelson et al., disclose a manufacturing method for forming a hollow component made of composite material using a fluid-removable core. International Patent Application Publication WO 2017/148998 to Amon et al. discloses a method for producing a fiber-reinforced structural hollow component having an internal channel. U.S. Pat. No. 9,815,268 to Mark et al. discloses a 3D printing method that deposits composite fiber material on dissolvable support material to form tubes. U.S. Patent Application Publication 2005/0169762 to Blume discloses a manufacturing method for forming a composite hollow-type turbine blade.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, a mandrel mold tool for forming a mandrel includes a plurality of mandrel mold tool members being configured for fastening together to form a mandrel mold tool having an internal compartment. The plurality of mandrel mold tool members each include an outer wall, an inner wall adjacent the outer wall, and an interior portion between the outer wall and the inner wall. The interior portion has a sparsely-infilled structure that is substantially permeable to fluids. The outer wall has a port for receiving a hardening fluid, the inner wall has a plurality of through-holes such that the hardening fluid, upon being introduced via the port, passes through the interior portion and the plurality of through-holes for hardening a sacrificial mold disposed in the internal compartment.

In another embodiment, a tooling method for molding composite includes forming a plurality of mandrel mold tool members, the plurality of mandrel mold tool members each having solid outer walls and sparsely filled interiors, the sparsely filled interiors being permeable to fluids, wherein inner walls of the mandrel mold tool members each have a plurality of holes therethrough. The method further includes assembling the plurality of mandrel mold tool members to form a mandrel mold tool, packing the mandrel mold tool with ceramic fill material, and providing a hardening fluid into the sparsely filled interior of each of the plurality of mandrel mold tool members such that the hardening fluid permeates through the plurality of holes for partially curing the ceramic fill material to form a semi-hardened sacrificial mold for use as a mandrel for forming composite ducts.

In yet another embodiment, a mandrel mold tool for forming a mandrel used to form composite ducts includes a plurality of mandrel mold tool members being configured for fastening together to form a mandrel mold tool, the mandrel mold tool forming an internal compartment. The plurality of mandrel mold tool members each include an outer wall and an inner wall adjacent the outer wall, a first flange at a first end of the outer wall and the inner wall, and a second flange at a second end, opposite the first end, of the outer wall and the inner wall. The first flange and the second flange each have a through hole for accepting a fastener. An interior portion between the outer wall and the inner wall has a sparsely-infilled structure that is substantially permeable to fluids. The outer wall has a port for receiving a hardening fluid. The inner wall has a plurality of holes therethrough such that the hardening fluid, upon being introduced via the port, passes through the interior portion and the plurality of holes for hardening a sacrificial mold disposed in the internal compartment.

BRIEF DESCRIPTION OF THE DRAWINGS

Illustrative embodiments of the present disclosure are described in detail below with reference to the attached drawing figures, which are incorporated by reference herein and wherein.

Figure 1:
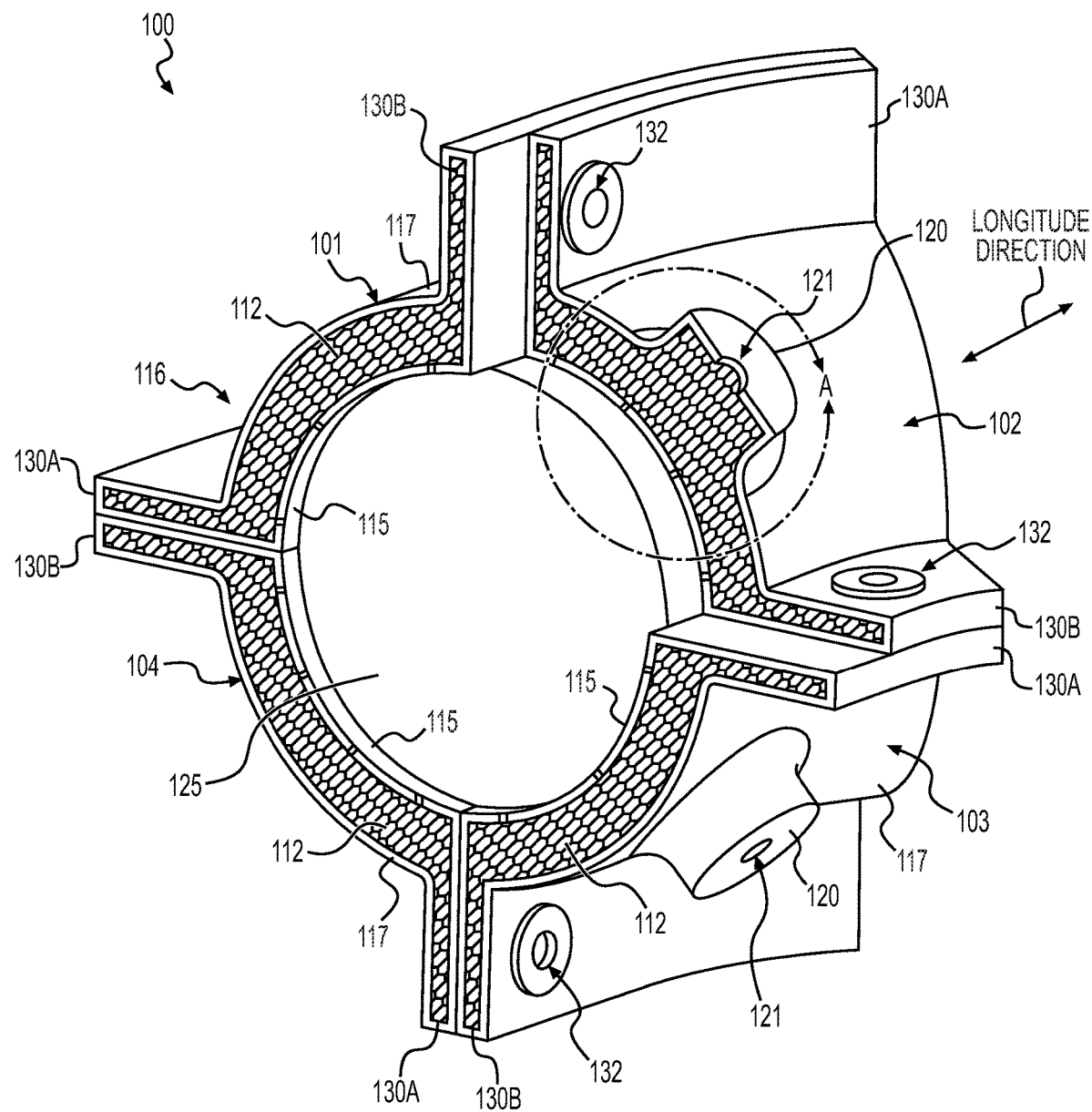
FIG. 1 is a cross-sectional perspective view of a mandrel mold tool used for forming a mandrel to mold composite ducts, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Manufacturing of composite parts having a hollow portion often includes a sacrificial tooling that is used to provide a temporary structure for supporting prepreg layups during the process of forming a composite laminate. Once the composite laminate has been hardened, the sacrificial tooling is removed from the hollow portion, typically by a destructive process. For example, one existing method of creating composite ducting uses a eutectic salt mandrel as a sacrificial tooling. The eutectic salt is prepared as a hot liquid and cast into a high temperature-resistant mandrel mold. The eutectic salt material hardens upon cooling and is demolded to provide a mandrel suitable for composite layup. Following hardening of the composite layup, the mandrel is heated and melted out, providing a finished duct. However, the eutectic salt method is dangerous due to the high heat used (e.g., over 400 degrees Fahrenheit), it causes ergonomic risk due to heavy weight, and it creates hazardous waste requiring proper disposal.

Embodiments of the present disclosure provide a 3D-printed mandrel mold tool having a sparse infill area to enable post processing of a sacrificial mold. The mandrel mold tool is used in a tooling method for forming a mandrel that may be used for molding composite ducts. Specifically, the mandrel mold tool is used to form and harden a sacrificial mold, which may be used to mold composite ducts in a manner that avoids the high heat, heavy weight, and hazardous waste of prior methods. Further advantages include a shorter lead time and reduced cost compared to prior methods.

FIG. 1 is a cross-sectional perspective view of an exemplary mandrel mold tool 100 used for forming a mandrel to mold composite ducts. Mandrel mold tool 100 may include a plurality of members, such as a first member 101, a second member 102, a third member 103, and a fourth member 104, as depicted in FIG. 1. Mandrel mold tool 100 may include greater or fewer than four members without departing from the scope hereof. For example, as many members (e.g., "splits") may be used in mandrel mold tool 100 as required for demolding. In certain embodiments, two members are used to form a cylindrically shaped internal compartment (e.g., a top member and a bottom member).

The four mandrel mold tool members 101-104 are adapted to be held together, as depicted in FIG. 1. An internal compartment is formed by the mandrel mold tool members 101-104 for containing a sacrificial mold 125 therein. For the embodiment depicted in FIG. 1, tool members 101-104 are arranged in opposite pairs about a radial direction (e.g., first tool member 101 is opposite third tool member 103, and second tool member 102 is opposite fourth tool member 104). The tool members 101-104 envelope the internal compartment formed therebetween. Each of tool members 101-104 encloses one quarter of the circumference such that the internal compartment is shaped as an open-ended cylindrical tube. Additional mandrel mold tool members are shaped as a cap to enclose the opening at each end of the open-ended cylindrical tube (see FIG. 3).

Each of the mandrel mold tool members 101-104 includes a thin flange at opposite ends. For example, a first end of mandrel mold tool member 101 includes a first flange 130A; a second end, opposite the first end, includes a second flange 130B. Each of the mandrel mold tool members 101-104 includes first and second flanges 130A, 130B, which are adapted for mating with corresponding flanges of neighboring tool members. For example, a second flange 130B of first member 101 mates with a first flange 130A of second member 102. Each of flanges 130A, 130B includes a small raised portion having a through hole 132 to enable fastening together via a removable fastener (not shown). Other means of fastening the plurality of mandrel mold tool members together may be used without departing from the scope hereof.

Sacrificial mold 125 is formed of an unhardened material, such as a ceramic fill material having very fine ceramic microspheres. In certain embodiments, the ceramic fill material is a FASTCORE™ WSC 1030 (Advanced Ceramics Manufacturing, LLC., Tucson, AZ). In embodiments, the ceramic fill material is packed by hand or otherwise forced using pressure into the open ends of the mandrel mold tool 100. Tool 100 holds the ceramic fill material until it can be partially cured, as further described below. Upon partial curing of the ceramic fill material, sacrificial mold 125 is semi-hardened in a shape determined by the shape of the internal façade of tool 100. After demolding tool 100, sacrificial mold 125 may then be used as a mandrel for forming composite laminate ducting. For example, prepreg layups may be wrapped around the hardened mold 125 (i.e., the mandrel) and hardened to form a composite laminate in the shape of the mandrel. Sacrificial mold 125 is then removed (e.g., dissolved or destroyed) leaving the composite laminate behind in the shape of a duct. In certain embodiments, the ceramic fill material may be dissolved with water and washed out of the composite laminate duct without generating any hazardous waste.

Each of the mandrel mold tool members 101-104 may be formed by an additive manufacturing process (e.g., a 3D-printing process) such as fused deposition modeling (FDM). Any suitable material compatible with an additive manufacturing process may be used to form tool members 101-104. In some embodiments, tool members 101-104 are formed of ULTEM™ 1010 resin (Stratasys Ltd., Rehovot, Israel). ULTEM™ 1010 accommodates higher temperatures compared to alternative FDM materials.

A sparse infill area 112 is formed within each of the mandrel mold members 101-104 according to a computer solid model (e.g., a 3D computer aided design (CAD) model). For example, each of the mandrel mold tool members 101-104 includes an inner wall 115 and an outer wall 117 with sparse infill area 112 therebetween. The sparse infill area 112 enables a fluid (e.g., a gas or low-viscosity liquid) to penetrate and disperse evenly throughout each of the tool members 101-104. The sparse infill area 112 may include a honeycomb or similar intermittent structure that provides reinforcement but is substantially permeable to fluids. The fluid may be a hardening fluid adapted for curing or partially curing the ceramic fill material to harden or partially harden sacrificial mold 125. In certain embodiments, the hardening fluid is carbon dioxide ($CO_2$) gas;

however, other gases or low-viscosity liquids may be used as the hardening fluid without departing from the scope hereof.

A port 120 is formed on an exterior side of each of the mandrel mold tool members 101-104, although port 120 is not visible on tool member 101 or tool member 104 in the perspective view of FIG. 1 for clarity of illustration. Each port 120 may be 3D-printed as a raised "boss" that protrudes outside the outer wall of each of the tool members 101-104. Each port 120 provides an opening 121 that may be used to provide hardening fluid from an outside source. As depicted in FIGS. 1 and 3, a cross section through port 120 of second tool member 102 illustrates the opening 121. This is best viewed in the close-up view of Detail A in FIG. 2. For example, opening 121 may be drilled through port 120 for each of the tool members 101-104 and adapted for receiving plumbing fittings (e.g., threaded to receive quick-disconnect fittings).

Figure 2:
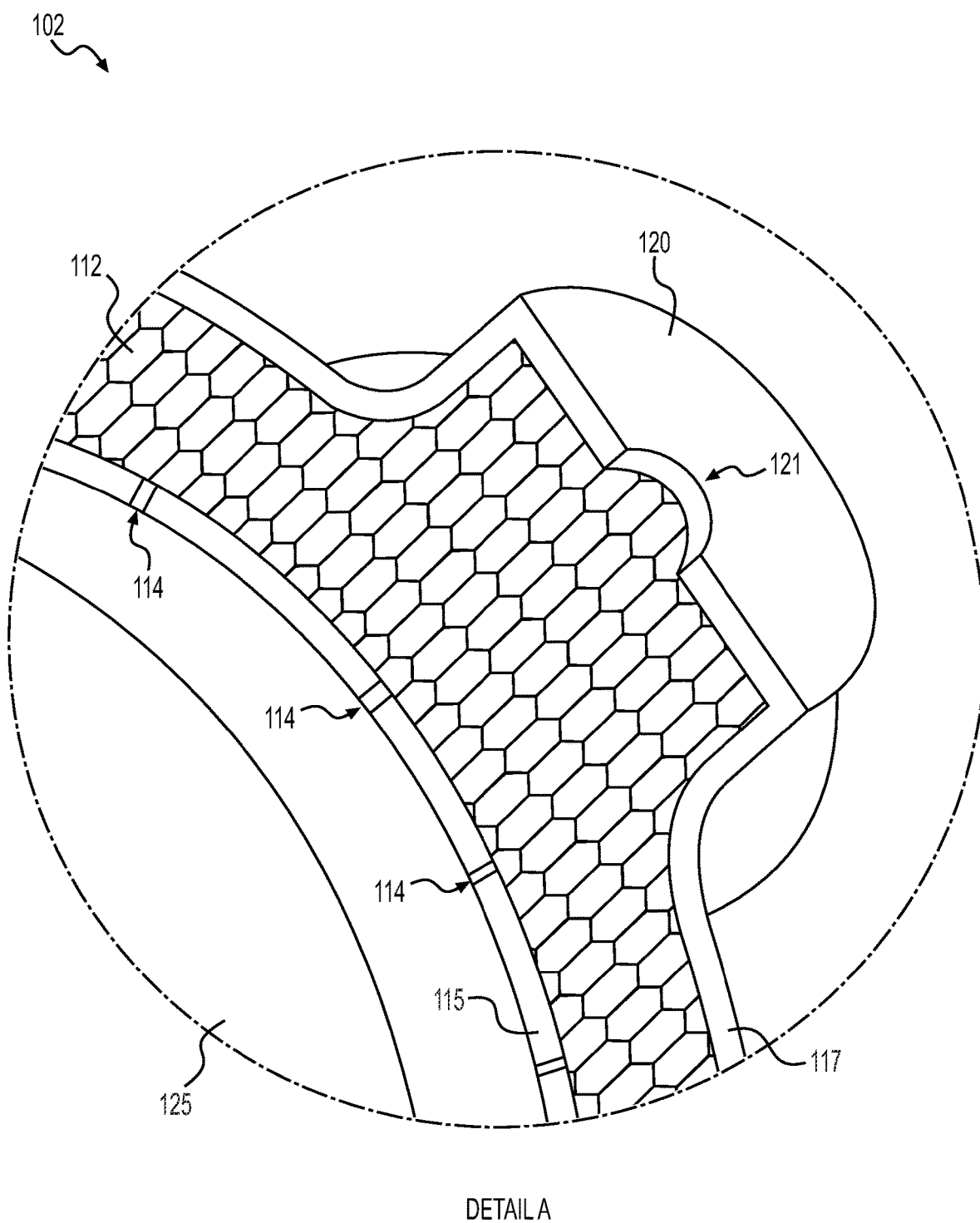
FIG. 2 shows a close up view of a portion of the mandrel mold tool used for forming a mandrel to mold composite ducts of FIG. 1.
Figure 3:
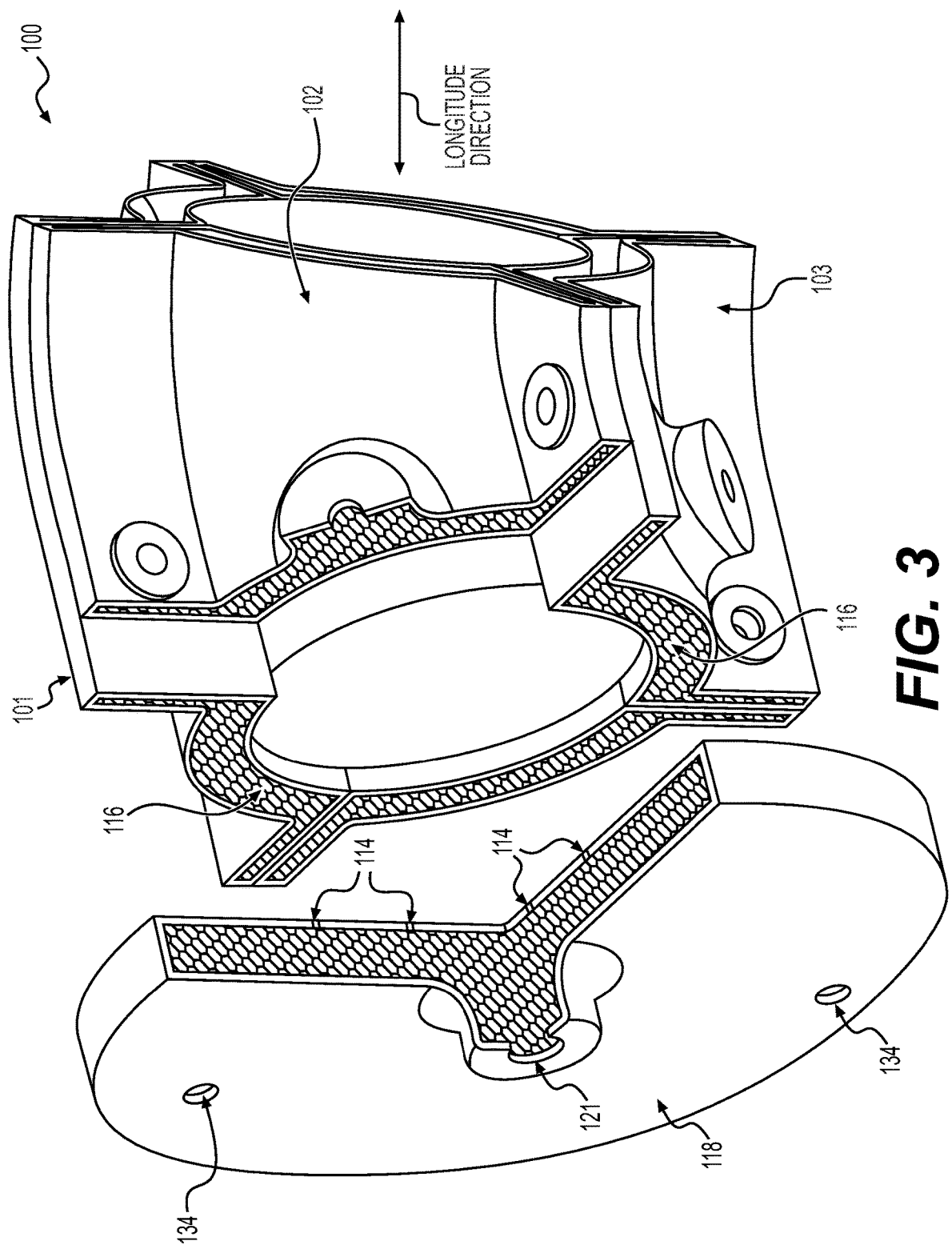
FIG. 3 shows an embodiment of a cap for capping an open end of the mandrel mold tool of FIG. 1.

FIG. 2 shows a close up view of a portion of second mandrel mold tool member 102, as indicated by the detail labeled "A" in FIG. 1. As can be seen in FIG. 2, the sparse infill area 112 extends through the raised boss portion of port 120.

A plurality of holes 114 are included along an inner wall of each of the tool members 101-104, as best viewed in the close up view of FIG. 2. The plurality of holes 114 are through-holes adapted for exposing the ceramic fill material of sacrificial mold 125 to the hardening fluid (e.g., $CO_2$ gas) while still constraining the fill material within the tool members 101-104. Therefore, the plurality of holes are relatively small when compared to a diameter of the ceramic microspheres. In certain embodiments, the plurality of holes 114 are between about 0.040-inch to about 0.090-inch diameter holes spaced apart as needed to provide sufficient fluid to partially cure sacrificial mold 125. The locations of holes 114 are adapted to direct flow of hardening fluid evenly around the surface of the sacrificial mold 125. For example, the holes may be evenly spaced apart in a grid-like pattern. In certain embodiments, the spacing between holes is about one-inch to about two-inches apart.

A plurality of tool members may be aligned in a longitudinal direction and adjoined end-to-end (e.g., fastened together with fasteners, not shown) for forming sections of ducting that are longer than each of the tool members. For example, a plurality of first members 101 may be sequentially aligned longitudinally and fastened together, a plurality of second members 102 may be sequentially aligned longitudinally and fastened together, a plurality of third members 103 may be sequentially aligned longitudinally and fastened together, and a plurality of fourth members 104 may be sequentially aligned longitudinally and fastened together for forming sections of ducting that are longer than individual tool members 101-104.

Returning to FIG. 1, tool members 101-104 each include open ends 116. Not all open ends 116 are enumerated for clarity of illustration. Open ends 116 may be fluidly coupled together with corresponding open ends of adjoining tool members (not shown). Each of the plurality of tool members 101-104 may be individually plumbed with tubing that feeds $CO_2$ into the sparse infill areas 112 for providing hardening fluid. Adjoining tool members fastened together enable hardening fluid to be dispersed between the adjoining tool members when fastened together end-to-end. Alternatively, open ends 116 of the mandrel mold tool 100 may be capped, as further described below in connection with FIG. 3.

FIG. 3 depicts an exemplary cap 118 for capping an end of mandrel mold tool 100. In embodiments, tool members 101-104 each include open ends 116, which may be capped with cap 118. Openings of the internal compartment of tool 100 (e.g., openings at the end of the open-ended cylindrical tube) are also enclosed via cap 118. Similar to tool members 101-104, cap 118 includes port 120 having through hole 121 for providing hardening fluid, sparse infill area 112 that enables the hardening fluid to permeate throughout cap 118, and a plurality of holes 114 for evenly distributing the hardening fluid to the sacrificial mold 125. Caps 118 are 3D-printed to have a similar thickness as the main mold section. Caps 118 may be fastened to open ends 116 with fasteners (not shown) via through holes 134. Port 120 may be plumbed with hardening fluid (e.g., $CO_2$ gas) which may flow through the sparse inner area 112, similar to each of the tool members 101-104. As depicted in FIG. 3, the tool members 101-104 of mandrel mold tool 100 may have a curved shape along the longitudinal direction for forming a curved composite duct.

In operation, tool 100 includes a pathway and venting arrangement that allows the hardening fluid (e.g., $CO_2$ gas) to permeate the ceramic fill material for precuring. $CO_2$ gas is provided through port 120 (e.g., pneumatically), disperses throughout the sparse infill area 112, and passes through the plurality of holes 114 to permeate the ceramic fill material, thereby partially curing sacrificial mold 125 to make it firm enough for demolding (i.e., the removal of tool members 101-104). Following demolding, sacrificial mold 125 may be fully cured by applying heat (e.g., in an oven).

Figure 4:
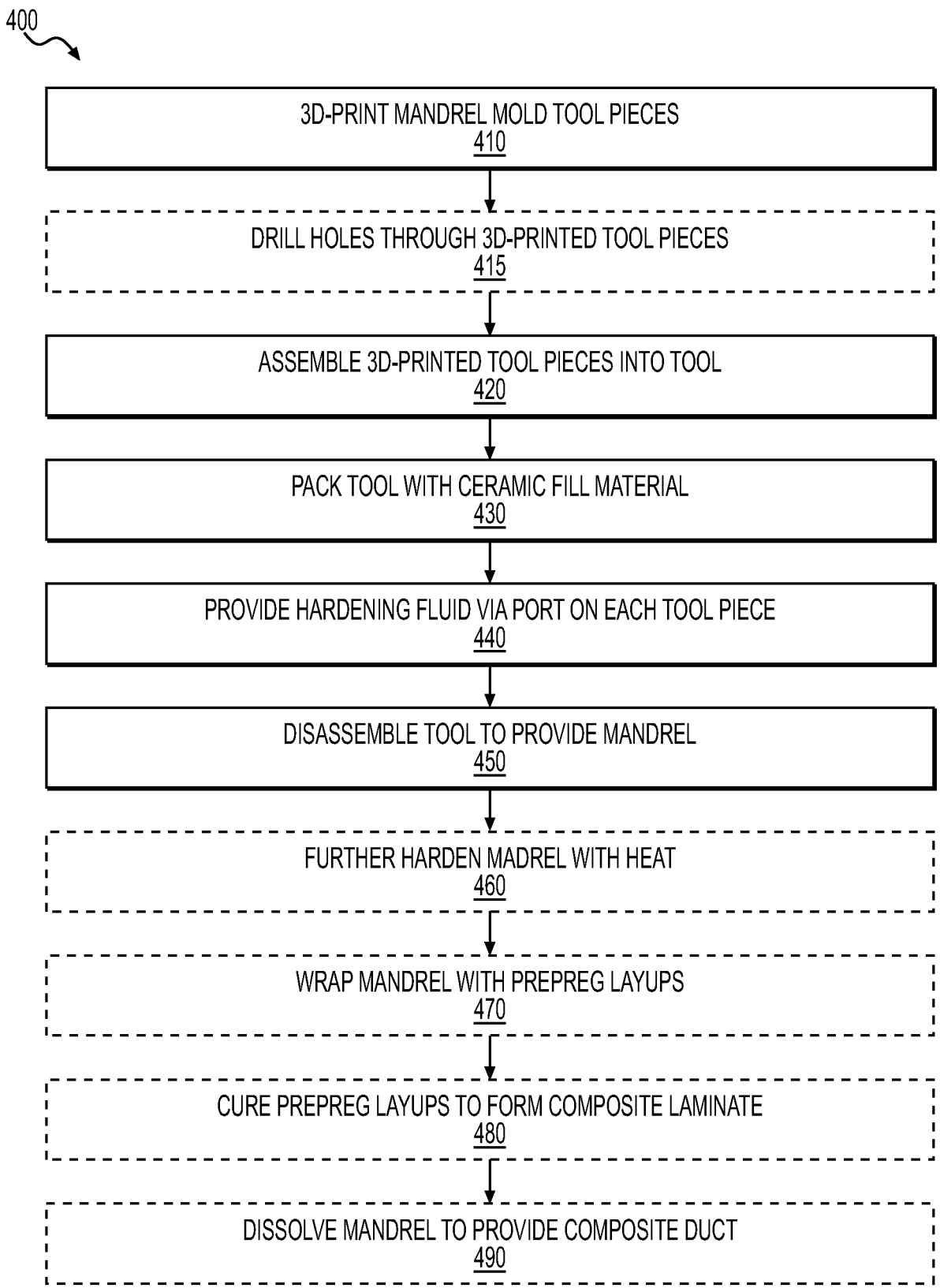
FIG. 4 is a block diagram illustrating an embodiment of a tooling method for forming a mandrel to mold composite ducts using the mandrel mold tool of FIG. 1.

FIG. 4 is a block diagram illustrating an exemplary tooling method 400 for forming a mandrel to mold composite ducts using tool 100 of FIG. 1. Not all steps listed in the FIG. 4 need to be carried out in the specific order described.

In a step 410, a plurality of mandrel mold tool members are 3D-printed. In an example of step 410, mandrel mold tool members 101, 102, 103, 104 of FIG. 1 are formed of ULTEM™ 1010 resin according to a computer solid-model by fused deposition modeling (FDM). The tool members 101-104 are formed with solid outer walls and a sparsely filled interior (e.g., having a honeycomb-like structure) that is permeable to fluids (e.g., gases and low-viscosity liquids).

In an optional step 415, holes are drilled through the each of the plurality of 3D-printed mandrel mold tool members. In an example of optional step 415, a hole 121 is drilled through each port 120, a hole 132 is drilled through each flange 130, and a plurality of holes 114 are drilled through an inner wall of each of the tool members 101-104, as depicted in FIG. 2.

In a step 420, the plurality of mandrel mold tool members are assembled into a tool. In an example of step 420, tool members 101-104 are attached together via fasteners through holes 132 to form tool 100, FIG. 1.

In a step 430, the tool is packed with ceramic fill material. In an example of step 430, tool 100 is hand packed with FASTCORE™ WSC 1030. At the completion of step 430, cap 118 may be fastened to open end 116 of tool 100, as depicted in FIG. 3.

In a step 440, a hardening fluid is provided via a port on each mandrel mold tool member. In an example of step 440, $CO_2$ gas is pneumatically pumped via tubes (e.g., plastic or steel pneumatic-rated tubes) connected to each port 120 of tool members 101-104 and cap 118 to partially cure the ceramic fill material for forming a semi-hardened sacrificial mold. After step 440, the sacrificial mold 125 is partially cured into a semi-hardened mandrel 125 that may be used for forming composite ducts.

In a step 450, the tool is disassembled to provide a mandrel that may be used for forming composite ducts. In an example of step 450, tool 100 is disassembled to demold mandrel 125 by removing fasteners located in through holes 132 of flanges 130.

In an optional step 460, the mandrel is further hardened by applying heat. In an example of optional step 460, the semi-hardened mandrel 125 is heated in an oven to further cure and harden the mandrel. The fully cured mandrel 125 may be used for forming composite ducts.

In an optional step 470, the partially or fully hardened mandrel is wrapped with prepreg layups. In an example of optional step 470, the mandrel 125 is wrapped with prepreg layups by hand or using an automated tape placement or winding method.

In an optional step 480, the prepreg layups are cured to form a composite laminate. In an example of optional step 480, the mandrel 125 wrapped with prepreg layups is heated in an oven until the prepreg layups are fully cured to form a composite laminate around mandrel 125.

In an optional step 490, the mandrel is removed to provide a composite laminate duct. In an example of optional step 490, mandrel 125 is dissolved and washed out of the composite laminate duct by applying water. A hollow composite laminate duct remains, without generation of hazardous waste. In another example of optional step 490, the mandrel 125 is dissolved with water into a non-hazardous slurry, and the non-hazardous slurry is drained, leaving behind a hollow composite laminate duct.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims.

The invention claimed is:

1. A mandrel mold tool for forming a mandrel, comprising:
 a plurality of mandrel mold tool members being configured for fastening together to form a mandrel mold tool with an internal compartment;
 the plurality of mandrel mold tool members each comprising:
  an outer wall;
  an inner wall adjacent the outer wall;
  an infill area comprising the substantial area separating the outer wall from the inner wall, further comprising an internal structure throughout which is substantially permeable to fluids and configured to disperse a hardening fluid throughout the infill area, such that the fluid surrounds and evenly distributes across an outer surface of the inner wall;
  a port located on the outer wall comprising an opening that is fluidly coupled to the infill area for providing the hardening fluid into the infill area; and
  a plurality of holes distributed across the entire surface of the inner wall, wherein each of the plurality of holes provides a fluid coupling between the infill area and the internal compartment such that hardening fluid passes through the plurality of holes with substantially even dispersal across a sacrificial mold disposed in the internal compartment and is accordingly hardened.

2. The mandrel mold tool of claim 1, wherein each of the plurality of mandrel mold tool members comprises a first mandrel mold tool member, a second mandrel mold tool member, a third mandrel mold tool member, and a fourth mandrel mold tool member, wherein the first, second, third, and fourth mandrel mold tool members are configured for fastening together for forming the internal compartment used to form a mandrel.

3. The mandrel mold tool of claim 2, wherein the internal compartment is an open-ended cylindrical tube and the first, second, third, and fourth mandrel mold tool members each provide one quarter of a circumference around the open-ended cylindrical tube.

4. The mandrel mold tool of claim 2, wherein additional adjoining mandrel mold tool members are aligned longitudinally and adjoined end-to-end with the first, second, third, and fourth mandrel mold tool members, respectively, for forming a mandrel mold tool that is longer than each of the first, second, third, and fourth mandrel mold tool members.

5. The mandrel mold tool of claim 1, wherein each of the plurality of mandrel mold tool members comprises:
 a first end having a first flange;
 a second end, opposite the first end, the second end having a second flange; and
 the first flange of a first mandrel mold tool member is configured for fastening together with the second flange of a second mandrel mold tool member.

6. The mandrel mold tool of claim 5, wherein the first flange and the second flange each have a through-hole for accepting a fastener therethrough.

7. The mandrel mold tool of claim 1, wherein each of the plurality of mandrel mold tool members comprises a first open end and a second open end opposite the first open end, wherein the first and second open ends are either:
 a) fastened to corresponding open ends of additional adjoining mandrel mold tool members for fluidly coupling thereto; or
 b) fastened to a cap configured to enclose the first or second open end and the internal compartment.

8. The mandrel mold tool of claim 7, wherein the cap is configured for fastening to a first open end or a second open end via fasteners, the cap comprising:
 an outer wall;
 an inner wall adjacent the outer wall;
 an infill area comprising the substantial area separating the outer wall from the inner wall, further comprising an internal structure which is substantially permeable to fluids and configured to disperse a hardening fluid throughout the infill area, such that the fluid surrounds and evenly distributes across an outer surface of the inner wall;
 a port located on the outer wall comprising an opening that is fluidly coupled to the infill area for providing the hardening fluid into the infill area; and
 a plurality of holes distributed across the entire surface of the inner wall, wherein each of the plurality of holes provides a fluid coupling between the infill area and the internal compartment such that hardening fluid passes through the plurality of holes with substantially even dispersal across a sacrificial mold disposed in the internal compartment and is accordingly hardened.

9. The mandrel mold tool of claim 1, wherein the plurality of holes are distributed across the surface of the inner wall in a grid pattern such that the hardening fluid is evenly dispersed around a surface of the sacrificial mold.

10. The mandrel mold tool of claim 1, wherein the port comprises a raised boss that protrudes outside the outer wall.

11. The mandrel mold tool of claim 1, wherein the internal structure is a honeycomb structure.

12. A mandrel mold tool for forming a mandrel used to form composite ducts, comprising:
a plurality of mandrel mold tool members being configured for fastening together to form a mandrel mold tool, the mandrel mold tool forming an internal compartment;
the plurality of mandrel mold tool members each comprising:
an outer wall and an inner wall adjacent the outer wall;
a first flange at a first end of the outer wall and the inner wall;
a second flange at a second end, opposite the first end, of the outer wall and the inner wall;
wherein the first flange and the second flange each have a through hole for accepting a fastener;
an infill area comprising the substantial area separating the outer wall from the inner wall, further comprising an internal structure which is substantially permeable to fluids and configured to disperse a hardening fluid throughout the infill area, such that the fluid surrounds and evenly distributes across an outer surface of the inner wall;
a port located on the outer wall comprising an opening that is fluidly coupled to the infill area for providing the hardening fluid into the infill area; and
a plurality of holes distributed across the entire surface of the inner wall, wherein each of the plurality of holes provides a fluid coupling between the infill area and the internal compartment such that hardening fluid passes through the plurality of holes with substantially even dispersal across a sacrificial mold disposed in the internal compartment and is accordingly hardened.

13. The mandrel mold tool of claim 12, wherein the internal compartment has at least one opening and at least one of the plurality of mandrel mold tool members is configured as a cap to enclose the opening.

14. The mandrel mold tool of claim 12, wherein the internal structure is a honeycomb structure.

15. A method of producing a mandrel used to form composite ducts, comprising:
assembling and utilizing the mandrel mold tool of claim 1;
an injecting step, wherein hardening fluid is injected into the port on the outer wall, such that the hardening fluid flows into and fills the infill area surrounding the inner wall;
a hardening step, wherein the hardening fluid is allowed to flow through the plurality of holes on the inner wall until it evenly distributes across and hardens the sacrificial mold; and
a demolding step, where the plurality of mandrel mold tool members are disconnected and removed to release the mandrel.

16. The method of claim 15, further comprising a curing step, wherein the released mandrel is fully cured in a heated oven.

17. The method of claim 15, further comprising:
using the mandrel as a mold for a laminate forming operation, in order to produce a composite duct.

18. The method of claim 17, wherein the laminate forming operation comprises:
wrapping the mandrel with a plurality of prepreg layups;
curing the plurality of prepreg layups wrapped around the mandrel in a heated oven, such that the prepreg layups harden into the composite duct; and
removing the mandrel from the composite duct after curing, such that the composite duct is made hollow.

19. The method of claim 18, wherein removing the mandrel comprises dissolving the mandrel with water into a non-hazardous slurry.

20. The method of claim 18, further comprising:
a 3D-printing step, wherein the mandrel mold tool members are 3D-printed; and
a drilling step, wherein a plurality of holes are drilled into the inner wall of the plurality of mandrel mold tool members.

* * * * *